March 14, 1967     H. DEURING     3,308,637
COUPLING ELEMENT
Filed June 30, 1965
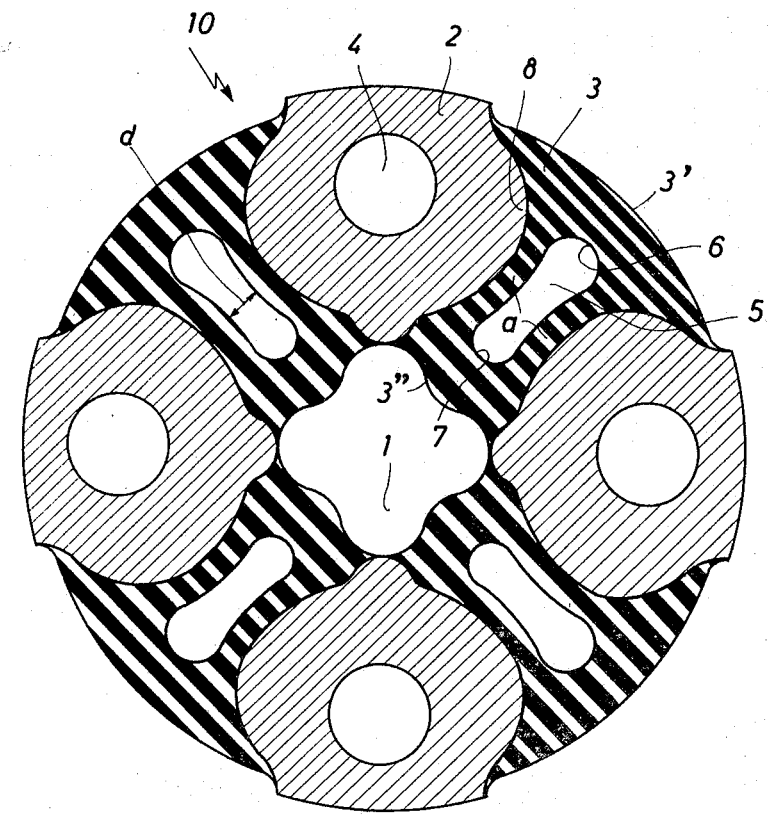
Inventor
Hans DEURING
By *Spencer & Kaye*
Attys

United States Patent Office 3,308,637
Patented Mar. 14, 1967

3,308,637
COUPLING ELEMENT
Hans Deuring, Burscheid, Cologne, Germany, assignor to Goetzewerke Friedrich Goetze A.G., Dusseldorf, Germany
Filed June 30, 1965, Ser. No. 468,504
Claims priority, application Germany, Oct. 23, 1964, G 41,843
7 Claims. (Cl. 64—13)

The present invention relates to a coupling element, especially to an elastic coupling element suitable for use in the steering mechanism of a motor vehicle.

There exist rotatable shafts, mounted for rotary movement, within given limits, especially steering shafts for automobiles and other motor vehicles, which have insets in the form of rotationally elastic coupling elements, whose purpose it is to absorb shocks and also to reduce the wear to which the bearings for the shaft are subjected in case the shaft is deflected too roughly or too abruptly.

If such a coupling element is part of the steering shaft of a motor vehicle, it should be as soft as possible, in the zero or neutral position of the steering gear in which the steering shaft is not subjected to any rotary forces, while the hardness or firmness of the coupling element should, after the steering shaft has been rotated throughout an angle of about 5 degrees, increase exceptionally quickly so that when the shaft has been rotated throughout about 7 degrees, a virtually rigid connection is established.

It is, therefore, the primary object of the present invention to provide a rotationally elastic coupling element which is capable of fulfilling the above requirements and, with this object in view, the present invention resides basically, in a rotationally elastic element which comprises a plurality of non-elastic members arranged about the axis of the coupling element and spaced circumferentially apart from each other, and a plurality of elastic members interposed between the non-elastic members, each of the elastic members having a recess which extends in the direction of a radius of the coupling element and which extends throughout the entire axial length of the coupling element. The inner end of each recess is spaced from the innermost extremity of the respective elastic member and the outer end of each recess is spaced from the outermost extremity of the respective elastic member. Each recess, in a region approximately midway between its inner and outer ends, is defined by walls which bulge toward each other and which, at least when the coupling element is in unstressed condition, are spaced from each other. Also, the non-elastic members are provided with outward bulges which are parallel to the bulging walls of the elastic members.

In practice, the bulging walls are symmetrical with respect to a radius passing through the respective recess.

In accordance with another feature of the present invention, the inner and outer ends of each recess have semicircular cross sections, the radius of curvature of the outer end being greater than the radius of curvature of the inner end.

Additional objects and advantages of the present invention will become apparent upon consideration of the following description when taken in conjunction with the accompanying drawing in which the single figure is a cross section of a coupling element in accordance with the present invention, the coupling element being particularly suited for use in the steering shaft of a motor vehicle and comprising four non-elastic members in the form of metallic sleeves, interconnected by elastic members in the form of rubber bodies.

Referring now to the drawing, the same shows a coupling element 10 according to the present invention and comprising a plurality of circumferentially spaced apart non-elastic members such as metallic sleeves or bushings 2 and a plurality of elastic members 3, made of rubber or rubber-like material, interposed between the members 2. The parts 2 and 3 may be firmly bonded or otherwise joined to each other, or they may lie loosely on each other.

The coupling element is shown as being provided with a central opening 1, in which is received one end of the steering shaft (not shown). A second, similar coupling element (not shown) which lies against the first coupling element and which has arranged in its central opening the end of a shaft aligned with the steering shaft, is connected to the first coupling element by means of bolts which pass through the bores 4 of the respective pairs of axially aligned sleeves 2.

Each of the elastic members 3 has a recess 5 which extends, in axial direction, throughout the entire axial length or thickness of the coupling element. Each recess is a closed recess, in the sense that the radially outer end 6 of each recess is spaced from the outermost extremity 3' of the respective member and the radially inner end 7 of each recess is spaced from the innermost extremity 3" of the respective member. The outer end 6 and inner end 7 of each recess are rounded and have a semicircular cross section, the radius of curvature of the outer end 6 being greater than the radius of curvature of the inner end 7.

As is shown in the drawing, the two sides of each recess 5 are walls which bulge toward each other so as to be nearest to each other in the region approximately midway between the ends 6 and 7, of each recess. The bulges are even, in the sense that they are generally symmetrical with respect to a radius passing through the center of each respective recess 5. It will be noted that, when the coupling element being in unstressed condition—this being the condition depicted in the drawing—the bulging walls which define the recess 5 are spaced from each other a distance $d$.

As is also shown in the drawing, each of the sleeves 2 is provided, at each side, with outward bulges 8 which are directed toward and are parallel to the inwardly bulging walls of the recesses 5 so that the outward bulges 8 of the sleeves 2 and the inward bulges formed by the side walls of the recesses 5 are nested, i.e., parallel to each other, to leave rubber webs $a$.

When the coupling element is twisted, it will pass, gradually, through three distinctly recognizable stages:

(1) When the coupling element is in its first operative condition, i.e., when, for example, the steering shaft is first deflected from its neutral position, a very soft coupling is provided, because the webs $a$ can approach each other, there being no material between them.

(2) When the twisting is continued beyond the point at which the webs $a$ first touch each other, the coupling element will be in its second operative condition, during which the webs $a$ will be compressed. The hardness of the coupling afforded by the element will, during this second operative condition, depend on the softness of the rubber of which the webs are made. The coupling element will continue in its second operative condition until the webs are compressed to their maximum, so that angular rotation throughout which this second operative condition is maintained will depend on the thickness of the webs.

(3) If the coupling is twisted after the webs have reached their maximum compression, the coupling element will enter its third operative condition, during which no significant further compression of the webs will occur, so that the bulges 8 of the sleeves 2 will, for all practical purposes, move in unison, thereby establishing what may be considered a virtually non-elastic or rigid coupling.

It will be appreciated that the angle throughout which the coupling element will be kept in its first operative condition is dependent on the size of the recess and, more particularly, on the minimum distance $d$ which the inwardly bulging walls of the recess 5 are spaced from each other when the coupling element is in its initial, unstressed condition, i.e., when the shaft to which the coupling element is attached is in its neutral or zero-deflection position. In practice, the distance $d$ which the nearest points of the inwardly bulging walls of the recess in the unstressed member 3 are spaced from each other will be such that the walls remain out of contact until the element has been rotated, for example, throughout an angle of 5°. The angle throughout which the coupling will be kept in its second operative condition will depend on the thickness of the webs $a$; thanks to the provision of the bulges 8 of the sleeves 2, the angle throughout which the coupling element is maintained in its second operative condition can be kept very small as, for example, until the angle of deflection is about 7°. In this way, the rate at which the coupling element increases its rigidity, as a function of angular rotation, can be made very high.

In practice, the non-elastic members will be rounded so as to keep the tension and shear forces as small as possible. The internal stresses to which the elastic members are subject may be reduced further by providing the outer and inner ends 6, 7, of the recess with the above-mentioned semicircular cross sections, the radius of curvature of the outer end being greater than the radius of curvature of the inner end.

It will thus be seen that, in accordance with the present invention, there is provided a coupling element which affords an initial soft coupling which rapidly changes over into a hard and ultimately virtually rigid coupling, as is required especially in the case of a coupling element to be incorporated in the steering mechanism of a motor vehicle. In practice, the coupling element can be constructed to meet the particular requirements since not only can the size of the recesses 5 and the thickness of the cross sections of the elastic members be varied to meet the needs of the situation, but also, the number of non-elastic and elastic members can be changed as required. The illustrated embodiment shows the use of four non-elastic and four elastic members, but the present invention is not limited to the use of this precise number of members.

The present invention should not be confused with a conventional coupling element incorporating two or more metal sleeves which are connected by means of rubber members, but which conventional coupling element lacks the recesses of the coupling element according to the present invention. Such conventional coupling element can thus be considered as the state of art prior to the present invention, but was not found to yield the hardness-to-deflection characteristic possessed by the coupling element according to the present invention.

Nor should the present invention be confused with a conventional claw-type clutch in which the rotational elasticity and the bending characteristic is increased by means of rubber pads interposed between the claws of the clutch, which pads are provided with holes that pass all the way through the rubber pads in radial direction. Experience has shown that this did not make it possible to adapt the coupling action to the particular operative position of the shaft, especially to the angle deflection of a steering shaft.

It will be understood that the above description of the present invention is susceptible to various modifications, changes and adaptations, and the same are intended to be comprehended within the meaning and range of equivalents of the appended claims.

What is claimed is:

1. A rotationally elastic coupling element having an axis and comprising, in combination:
   (a) a plurality of non-elastic members arranged about said axis and spaced circumferentially apart from each other; and
   (b) a plurality of elastic members interposed between said non-elastic members, each of said elastic members having a recess which extends in the direction of a radius of the coupling element and which extends throughout the entire axial length of the coupling element, the inner end of each recess being spaced from the innermost extremity of the respective elastic member and the outer end of each recess being spaced from the outermost extremity of the respective elastic member; each recess, in a region approximately midway between its inner and outer ends, being defined by walls which bulge toward each other and which, at least when the coupling element is in unstressed condition, are spaced from each other;
   (c) said non-elastic members being provided with outward bulges which are parallel to said bulging walls of said elastic members.

2. A coupling element as defined in claim 1 wherein said bulging walls are symmetrical with respect to a radius passing through the respective recess.

3. A coupling element as defined in claim 1 wherein the inner and outer ends of each recess have semicircular cross sections, the radius of curvature of said outer end being greater than the radius of curvature of said inner end.

4. A coupling element as defined in claim 1 wherein said elastic members are made of rubber.

5. A coupling element as defined in claim 1 wherein said non-elastic members are metal sleeves.

6. A coupling element as defined in claim 1 wherein consecutive elastic and non-elastic members are bonded to each other.

7. A coupling element as defined in claim 1 wherein consecutive elastic and non-elastic members are in loose contact with each other.

References Cited by the Examiner

UNITED STATES PATENTS 1,935,390  11/1933  Brown _____ 64—13

FOREIGN PATENTS 303,656  1/1929  Great Britain.
557,703  12/1943  Great Britain.

FRED C. MATTERN, Jr., *Primary Examiner.*

HALL C. COE, *Examiner.*